Patented Aug. 2, 1932

1,869,941

UNITED STATES PATENT OFFICE

BEVERLY OBER AND EDWARD HYATT WIGHT, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

PROCESS FOR MANUFACTURING ACID PHOSPHATE

No Drawing. Application filed June 19, 1926. Serial No. 117,170.

This invention relates to the manufacture of acid phosphate designed primarily for use as a fertilizer.

In the processes now used to obtain acid phosphate it is the general practice to treat ground phosphate rock with sulphuric acid in an open container. This mixture is agitated for a relatively short period and the resulting sludge is deposited in a den. In this den the reaction between the insoluble phosphate and acid proceeds until the mass takes on an initial firmness. It is then transferred to storage sheds wherein it is allowed to remain until the reactions run to completion and the product is cured and dried. Such processes are uneconomical in that the output is limited by the large time factor involved.

The primary object of our invention is to provide a process by which acid phosphate may be made in a much shorter time than heretofore.

Another object is to accelerate the reactions occurring in a mixture of phosphatic raw material and acid by adjustment of pressure and temperature conditions.

A further object is to devise a process, the separate steps of which may be carried out in rapid succession.

A still further object is to provide an apparatus comprising a minimum of parts and designed to carry out the process of this invention.

To accomplish these and other important objects, we purpose to treat insoluble phosphate with an acid in a pressure tight container and to exercise effective control of the actions there occurring by the proper regulation of temperature and pressure conditions.

We have found, as disclosed in our co-pending application, Serial No. 112,678, filed May 29, 1926, that a very desirable acid phosphate product may be obtained by first placing a batch of ground phosphate rock in an autoclave and by setting up a vacuum, or partial vacuum, to evacuate the air therein. By this method the subsequent reactions between the phosphate rock and acid were greatly accelerated because of the quick and complete penetration of the rock by the acid.

We have found by repeated experiments that a highly satisfactory product may be obtained without using this preliminary vacuum. In carrying out this method the phosphate rock, ground to a suitable fineness, is deposited in an autoclave and the container sealed. An acid such as sulphuric acid is then admitted and the mixture agitated. This agitation may be accomplished in any desired manner and by any suitable means. As an example, the shell of the autoclave may be provided with a stirring mechanism comprising a plurality of paddles which are geared to a suitable driving mechanism. While such a mechanism will serve the purpose, we prefer to agitate the mix by mounting the container itself for rotation.

In case a rotary autoclave is used, it may be fixed to the hollow shaft which is adapted to rotate in suitable bearings. The interior of this shaft may be utilized as a conduit to carry the sulphuric acid to the container to be there mixed with the rock. By connecting a pump in this line, the acid may be injected into the mass of rock with some force, thereby additionally agitating the reactive mix.

It is to be understood that instead of prepared sulphuric acid we may inject substances into the container which will there react to form sulphuric acid. For example, we may admit the products of combustion of sulphur and nitre and admit this with water into the container. It may be found desirable in this case to provide three pipes within the hollow shaft of the rotatable container. Two of these may be vapor lines to carry the sulphur dioxide and nitrous anhydride, and the third a water conduit. These pipes may terminate in a mixing chamber having connection with the interior of the autoclave, in which the substances react to form nitrosylsulphuric acid.

It will be appreciated that the process naturally suggests many mechanical ramifications and hence any description of particular mechanisms are to be considered merely as examples of the many mechanical adaptations that may be employed.

Another possible method of introducing sulphuric acid to the rock is to first form sulphur trioxide and then admit this with a determined quantity of water through the hollow shaft into the autoclave. The advantage of this method is that the heat of reaction between the sulphur trioxide and water is imparted to the rock mixture and serves to promote the general reaction. Also water and $SO_3$ are less corrosive and more easily handled in pipes than $H_2SO_4$. If a fixed container is to be used, the fluid conduits may be attached either to the cover or body. In the event that it is desired to use a rotary autoclave which has no hollow shaft, the fluid lines may be detachably coupled to either the cover or the body.

After the sulphuric acid has been admitted to the container by any of the above described methods, the mixture is agitated either by operation of the stirring mechanism or by rotation of the autoclave and the mass thoroughly mixed. As a result of the evolution of the gaseous products of reaction between the acid and the raw materials, such for instance as hydrogen fluoride and carbon dioxide, the pressure in the autoclave is greatly increased. At the same time the temperature of the mass is increased. This rise in temperature will vary with the character of the raw material used, particularly in respect to the carbonate content of the rock, for the reaction of sulphuric acid on these carbonates is exothermic.

It has been found that the reaction may be further accelerated by the application of external heat. The quantity of heat thus applied will depend in a large measure on the character of rock used, as has been explained. The external heat may be applied by providing burners below the mixer; steam, oil burners, or any satisfactory commercial heating apparatus may be used.

After the mixture in the autoclave has been allowed to remain for a time calculated as sufficient to allow complete interaction between the rock and acid, the pressure is released. This may be done by releasing a valve placed on the cover of the container. This quick drop in pressure is accompanied by a drop in temperature. In tests which we have made with samples we have found that when a generated pressure of ninety pounds in the container is reduced to atmospheric pressure, there was a simultaneous drop in temperature of thirty degrees.

This release in pressure and the concomitant cooling initiates and accelerates crystallization of the mass. The rapid evacuation of the gases tends to render the mass porous and thus provides an intersticial structure which is in excellent physical condition for the crystallization. The quick drop in temperature greatly aids the crystallizing process.

After the mass in the autoclave has been exposed to atmospheric pressure and temperature for a time sufficient to insure an almost complete crystallization, the autoclave is then closed. A vacuum pump is then connected to the autoclave by any suitable means and the air therein evacuated. This evacuation removes hot vapors and the occluded moisture in the mass thus serving to dry the product. The vacuum thus set up within the autoclave is attended by a quick drop in temperature which operates to further aid crystallization. After the vacuum treatment the dry crystallized product is removed from the autoclave and is then ready for grinding and subsequent shipment.

It will now be observed that all of the steps of the process may be carried out in one container. In this element the components are mixed, allowed to react, are crystallized and dried. By the utilization of this single means, the usual receiving den and curing chambers are eliminated and no extended curing time is required. The cost of operation is greatly decreased not only by the simplicity of the apparatus but by the fact that this process may be completed in a much shorter time than could be done heretofore and hence the turn over of material is correspondingly greater.

We claim:

1. A process for manufacturing acid phosphate comprising the steps of initially mixing phosphate rock and an acid at atmospheric temperature and pressure, increasing the temperature and pressure during the reaction stage, decreasing the pressure and temperature and subsequently further decreasing the pressure.

2. A process for manufacturing acid phosphate comprising acidulating ground phosphate rock in a sealed container, increasing the temperature and pressure during the reaction stage, subsequently decreasing the temperature and pressure to crystallize the mix and further decreasing the temperature and pressure to complete the crystallization and drying.

In testimony whereof we affix our signatures.

BEVERLY OBER.
EDWARD HYATT WIGHT.